Aug. 15, 1961    M. W. GUYER    2,996,130
ROTARY HOE TANDEM CONNECTION
Filed Dec. 16, 1958    2 Sheets-Sheet 1

INVENTOR.
MORRIS W. GUYER
BY
Atty.

Aug. 15, 1961 M. W. GUYER 2,996,130
ROTARY HOE TANDEM CONNECTION
Filed Dec. 16, 1958 2 Sheets-Sheet 2

INVENTOR.
MORRIS W. GUYER
BY
Atty.

United States Patent Office 2,996,130
Patented Aug. 15, 1961

2,996,130
ROTARY HOE TANDEM CONNECTION
Morris W. Guyer, Spokane, Wash., assignor to Calkins Manufacturing Company, Spokane, Wash.
Filed Dec. 16, 1958, Ser. No. 780,794
4 Claims. (Cl. 172—596)

This invention relates to an improvement in the connection of rotary hoe cultivating implements of the type shown and described in the prior application of Dwight L. Calkins, Ser. No. 722,007, filed March 17, 1958, now abandoned, for Rotary Hoe. In these implements the rotary hoes are mounted in a row on a shaft, the ends of which are mounted in pedestals at the ends of a framework that extends over the row of hoes and that is provided with a tongue to attach to another like implement or to a towing vehicle. The tongue is pivoted to the framework to swing horizontally, and means are provided to hold the framework in any one of several angular positions with respect to the tongue. It is the purpose of the present invention to provide a tandem connection for these implements that enables the operator to vary the positions of the implements connected in tandem, both as to spacing and angularity with respect to each other, and angularity with respect to their tongues.

The nature and advantages of my invention will appear more fully from the following description and the accompanying drawings illustrating a preferred form of the invention.

Figure 1:
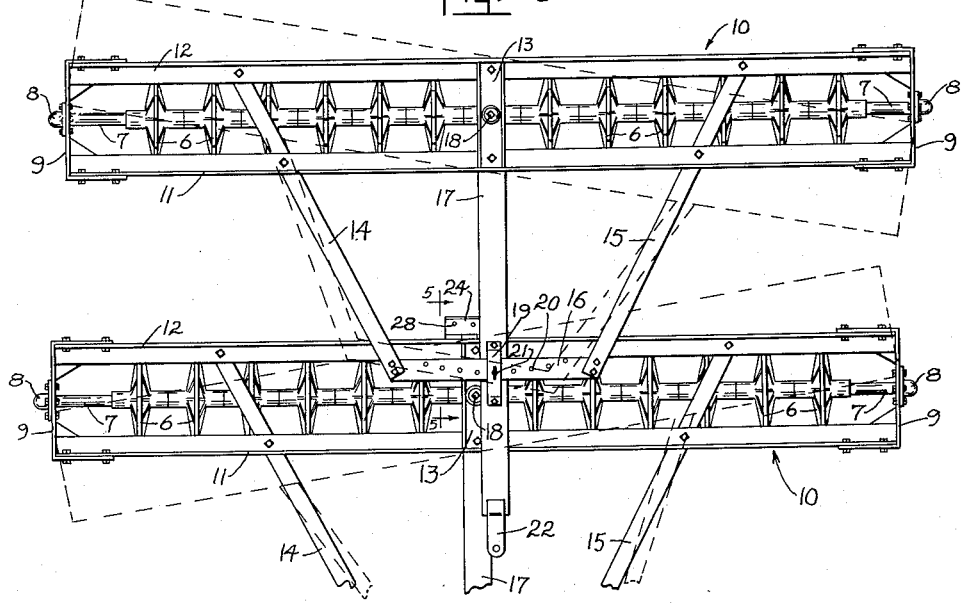
FIGURE 1 is a plan view of a pair of implements connected together by my improved tandem connection, different angular positions of the two implements being indicated by dotted lines.
Figure 2:
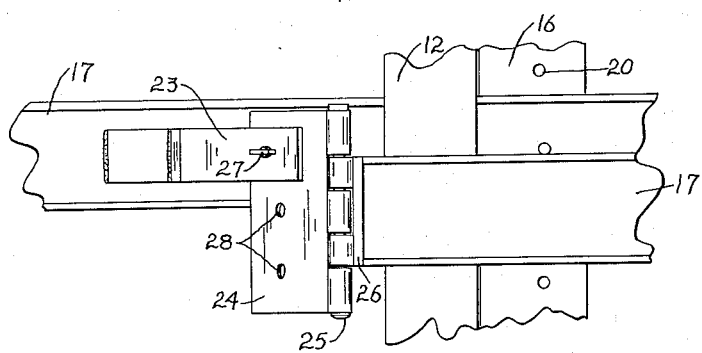
FIGURE 2 is an enlarged bottom plan view of the connection.

The rotary hoe implement to which my invention applies comprises hoe implements 6 arranged in a row upon a shaft 7. The shaft 7 has its ends journalled in bearings 8 on depending pedestals 9 of a framework 10. Each framework 10 has a front bar 11, a rear bar 12, and a cross bar 13. The cross bar 13 and the pedestals 9 are bolted to the bars 11 and 12. The bars 11 and 12 also carry two forwardly and inwardly extending bars 14 and 15 which have their forward ends connected together by a guide bar 16. Each implement has a tongue 17 pivoted thereto. The pivotal connection comprises a bolt 18 extending through the tongue and the cross bar 13. Each tongue 17 has a strap 19 bolted on the top thereof making an opening through which the guide bar 16 extends. The guide bar 16 has a series of apertures 20 therein arranged equidistant from the pivot bolt 18. A securing pin 21 is passed through the strap 19, one of the apertures 20, and the tongue 17, to hold the tongue 17 at the desired angle to the framework 10.

The connecting means by which one implement is pulled behind another comprises two clevises 22 and 23 on each tongue. The clevis 22 is at the front end of the tongue and aligned with it. The clevis 23 is secured to the under face of the tongue 17 rearwardly of the strap 19 and extends forwardly and downwardly from the tongue at an angle of about 30 degrees. Each tongue 17 has a plate 24 hinged to its rear end by a hinge pin 25 and a hinge piece 26 that is fixed to the tongue.

Figure 3:
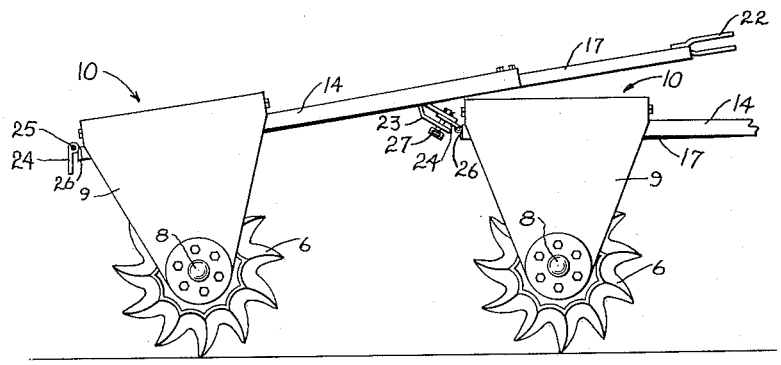
FIGURE 3 is a side view of the two implements, showing them closely coupled with the tongue of the rear implement riding on the front implement.
Figure 4:
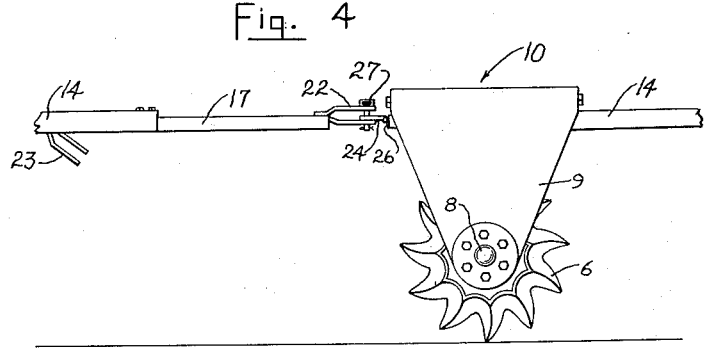
FIGURE 4 is a side view of the front implement, showing the tongue of the rear implement connected to space the implements at their greatest distance apart.
Figure 5:
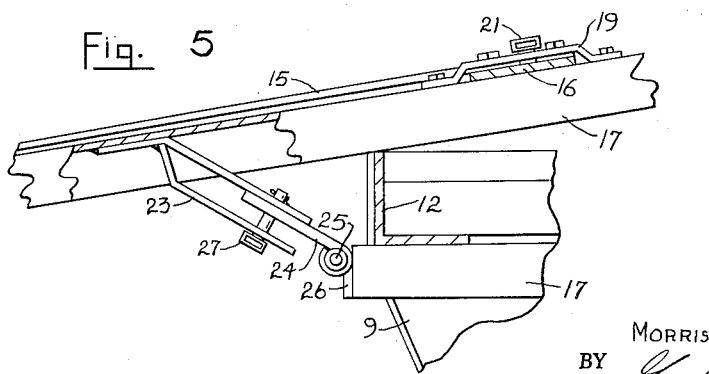
FIGURE 5 is a fragmentary sectional view on an enlarged scale, taken on the line 5—5 of FIGURE 1.

FIGURES 3 and 4 show how the hinged plate 24 cooperates with both clevises and a clevis pin 27 to connect the tongues to each other, either in the close-up overlapped "piggy back" position of FIGURE 3, or the extended tandem position of FIGURE 4. In either position the plate 24 can align with the clevis to which it attaches.

This improvement provides a tandem connection between the implements that allows close coupling for all conditions where it is needed. The close coupling rests the tongue of the rear implement upon the rear bar 12 of the front implement to give more close accurate positioning of the hoes of the rear implement with respect to the hoes of the front implement. The plate 24 has a series of apertures 28 therein so it can be used to offset the rear implement and guide the hoes thereof in paths between the paths of the front implement. The tandem connection still permits the greater spacing between implements provided by securing the clevis 22 to the plate 24. It retains the angular adjustment of one implement with respect to the other without obstructing it in any way. The pull of the implements is from tongue to tongue and relieves the framework of the strain due to this pull.

Having described my invention, I claim:

1. In a rotary hoe assembly embodying front and rear implements each comprising a plurality of rotary hoes arranged in a row coaxially on a shaft, and a framework extending over the hoes having pedestals depending therefrom in which the shaft is rotatably mounted, the improvement for connecting the front and rear implements in tandem comprising individual tongues respectively pivoted to the frameworks of the front and rear implements at the center thereof about vertical axes, the tongue of the front implement having a connecting plate hinged to the rear end thereof about a horizontal axis, the tongue of the rear implement having a forwardly and downwardly projecting clevis fixed thereon intermediate its ends in front of the framework of the rear implement and releasable means adapted to secure said clevis to said plate.

2. In a rotary hoe assembly embodying front and rear implements each comprising a plurality of rotary hoes arranged in a row coaxially on a shaft, and a framework extending over the hoes having pedestals depending therefrom in which the shaft is rotatably mounted, the improvement for connecting the front and rear implements in tandem comprising individual tongues respectively pivoted to the frameworks of the front and rear implements at the center thereof about vertical axes, individual means fixed on each framework extending forwardly therefrom and adjustably engaged with the respective tongue pivoted thereto at a distance from the framework adapted to maintain the framework at a desired angle with respect to its tongue, the tongue of the front implement having a connecting plate hinged to the rear end thereof about a horizontal axis, the tongue of the rear implement having a forwardly and downwardly projecting clevis fixed thereon intermediate its ends in front of the framework of the rear implement and releasable means adapted to secure said clevis to said plate.

3. In a rotary hoe assembly embodying front and rear implements each comprising a plurality of rotary hoes arranged in a row coaxially on a shaft, and a framework extending over the hoes having pedestals depending therefrom in which the shaft is rotatably mounted, the improvement for connecting the front and rear implements in tandem comprising individual tongues respectively pivoted to the frameworks of the front and rear implements at the center thereof about vertical axes, individual means fixed on each framework extending forwardly therefrom and adjustably engaged with the respective tongue pivoted thereto at a distance from the framework adapted to maintain the framework at a desired angle with respect to its tongue, the tongue of the front implement having a connecting plate hinged to the rear end thereof about a horizontal axis, said plate extending transversely with respect to the tongue of the front implement and having an aperture cut therethrough offset laterally with respect to the center line of said last-named tongue, the tongue of the rear implement having fixed thereon a forwardly and downwardly extending member intermediate its forward end and its respective framework, said member being pivotally connected to said plate by a pin passing through said aperture whereby to guide the hoes of the rear implement in paths between the paths created by the hoes of the front implement.

4. The invention as defined in claim 3 wherein said member forms an acute angle with respect to the portion of the tongue of the rear implement forward of said member.

References Cited in the file of this patent

UNITED STATES PATENTS

| | | |
|---|---|---|
| 853,160 | Cass | May 7, 1907 |
| 1,113,241 | Niesz | Oct. 13, 1914 |
| 2,464,227 | Gurries et al. | Mar. 15, 1949 |

FOREIGN PATENTS

| | | |
|---|---|---|
| 123,483 | Australia | Jan. 31, 1947 |
| 461,675 | Germany | June 26, 1928 |